United States Patent
Koshimuta

(10) Patent No.: US 6,515,710 B1
(45) Date of Patent: Feb. 4, 2003

(54) COLOR-DIFFERENCE SIGNAL CONVERSION CIRCUIT

(75) Inventor: Masaya Koshimuta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/530,141

(22) PCT Filed: Oct. 20, 1998

(86) PCT No.: PCT/JP98/04731
§ 371 (c)(1),
(2), (4) Date: Jul. 6, 2000

(87) PCT Pub. No.: WO99/21373
PCT Pub. Date: Apr. 29, 1999

(30) Foreign Application Priority Data

Oct. 22, 1997 (JP) .............................. 9-289394

(51) Int. Cl.[7] ................................. H04N 5/46
(52) U.S. Cl. ...................... 348/557; 348/555
(58) Field of Search ............... 348/554, 555, 348/557, 558, 553, 708, 638, 659, 453, 705, 706, 645; H04N 5/46

(56) References Cited

U.S. PATENT DOCUMENTS

| | | | | |
|---|---|---|---|---|
| 4,660,073 A | * | 4/1987 | Baumeister | 348/554 |
| 4,954,880 A | * | 9/1990 | Tanimizu | 348/500 |
| 6,175,387 B1 | * | 1/2001 | Han | 348/555 |

FOREIGN PATENT DOCUMENTS

| | | |
|---|---|---|
| DE | 39 21 731 | 1/1991 |
| EP | 0 475 035 | 3/1992 |
| JP | 3-70382 | 3/1991 |
| JP | 3-159493 | 7/1991 |
| JP | 04367694 | 12/1992 |
| JP | 6-121341 | 4/1994 |
| JP | 07038911 | 2/1995 |
| WO | WO 97/31476 | 8/1997 |

OTHER PUBLICATIONS

Bongsoon Kang et al., "New Approach for Mixing the RGB and CCIR601 Formatted Video Signals" International Conference on Consumer Electronics—Digest of Techni–Papers, Rosemont, IEEE, pp. 208–209, (Jun. 1995).
International Search Report corresponding to application No. PCT/JP98/04731 dated Feb. 26, 1999 (w/English Translation).

* cited by examiner

Primary Examiner—Michael Lee
(74) Attorney, Agent, or Firm—RatnerPrestia

(57) ABSTRACT

A television receiver comprises an input circuit (1) for Y, PB, and PR signals of an external component video input signal, a matrix circuit (5) having a function of converting luminance signal Y and transmitted chrominance signals PB and PR into primary color signals R, G, and B, and a function of converting luminance signal Y and color-difference signals B-Y and R-Y into primary color signals R, G, and B, and a color-difference conversion circuit (8). When Y, PB, and PR signals of an external component video input signal based on various television systems are fed to the color-difference signal conversion circuit (8), the video signal discriminating circuit (7) determines the video signal format based on data characterizing a video signal such as the horizontal sync frequency and the like of the input signal, and automatically converts the output of the color-difference signal conversion circuit (8) to either Y, PB, and PR signals or to Y, B-Y, and R-Y signals, and supplies the converted signals to the matrix circuit (5). The matrix circuit (5) generates primary colors faithful to the component video input signals of various incoming television systems.

5 Claims, 6 Drawing Sheets

FIG. 5

Digital television (DTV)systems in United State of America.

| System | | Number of Scanning Lines (lines) | Scanning System | Image Aspect Ratio | Horizontal Sync Freqency (kHz) | Vertical Sync Freqency (Hz) | Number of Horizontally-Aligned Pixels | Colorimetry Standard |
|---|---|---|---|---|---|---|---|---|
| SDTV- | 1 | 525 | Interlaced | 4:3/16:9 | 15.73 | 60.00 | 704/864 | SMPTE170M |
| | 2 | 525 | Interlaced | 4:3 | 15.73 | 60.00 | 640 | SMPTE170M |
| | 3 | 525 | Progressive | 4:3/16:9 | 31.47 | 60.00 | 704/864 | SMPTE170M |
| | 4 | 525 | Progressive | 4:3/16:9 | 15.73 | 30.00 | 704/864 | SMPTE170M |
| | 5 | 525 | Progressive | 4:3/16:9 | 12.58 | 24.00 | 704/864 | SMPTE170M |
| | 6 | 525 | Progressive | 4:3 | 31.47 | 60.00 | 640 | SMPTE170M |
| | 7 | 525 | Progressive | 4:3 | 15.73 | 30.00 | 640 | SMPTE170M |
| | 8 | 525 | Progressive | 4:3 | 12.58 | 24.00 | 640 | SMPTE170M |
| | 9 | 525 | Interlaced | 4:3 | 15.73 | 60.00 | 720 | SMPTE170M |
| | 10 | 525 | Progressive | 4:3/16:9 | 31.47 | 60.00 | 720 | SMPTE170M |
| HDTV- | 1 | 750 | Progressive | 16:9 | 45.05 | 60.00 | 1280 | SMPTE274M |
| | 2 | 750 | Progressive | 16:9 | 22.53 | 30.00 | 1280 | SMPTE274M |
| | 3 | 750 | Progressive | 16:9 | 18.02 | 24.00 | 1280 | SMPTE274M |
| | 4 | 750 | Progressive | 4:3/16:9 | 45.05 | 60.00 | 1280 | SMPTE274M |
| | 5 | 1125 | Progressive | 16:9 | 33.75 | 30.00 | 1920 | SMPTE274M |
| | 6 | 1125 | Progressive | 16:9 | 27.00 | 24.00 | 1920 | SMPTE274M |
| | 7 | 1125 | Interlaced | 16:9 | 33.75 | 60.00 | 1920 | SMPTE274M |
| | 8 | 1125 | Interlaced | 4:3/16:9 | 33.75 | 60.00 | 1920 | SMPTE274M |

FIG. 6

Video signals of major digital television (DTV) systems and personal computer (PC) in the United States of America.

| System | Number of Scanning Lines (lines) | Image Aspect Ratio | Horizontal Sync Freqency (kHz) | Vertical Sync Freqency (Hz) | Horizontal Blanking Width (μsec) | Horizontal Sync Pulse Width (μsec) | Type of Horizontal Sync Signal Waveform | Colorimetry Standard |
|---|---|---|---|---|---|---|---|---|
| SDTV-1 | 525 | 4:3/16:9 | 15.73 | 60.00 | 10.22 | 4.15 | (1) | SMPTE170M |
| 3 | 525 | 4:3/16:9 | 31.47 | 60.00 | 5.11 | 2.07 | (1) | SMPTE170M |
| HDTV-4 | 750 | 4:3/16:9 | 45.05 | 60.00 | 4.98 | 1.08 | (1) | SMPTE274M |
| 8 | 1125 | 4:3/16:9 | 33.75 | 60.00 | 3.77 | 1.19 | (2) | SMPTE274M |
| PC:VGA | 525 | 4:3 | 31.47 | 59.95 | 6.36 | 3.81 | (1) | No Standard |
| PC:SVGA | 628 | 4:3 | 37.88 | 60.32 | 6.40 | 3.20 | (3) | No Standard |
| PC:MAC2 | 525 | 4:3 | 35.00 | 66.67 | 7.41 | 2.12 | (1) | No Standard |

Type of Horizontal Sync. Waveform
(1) Negative-polarity pulse, dual-value waveform
(2) Positive-polarity pulse, dual-value waveform
(3) Positive-negative dual-polarity pulse, tri-value waveform

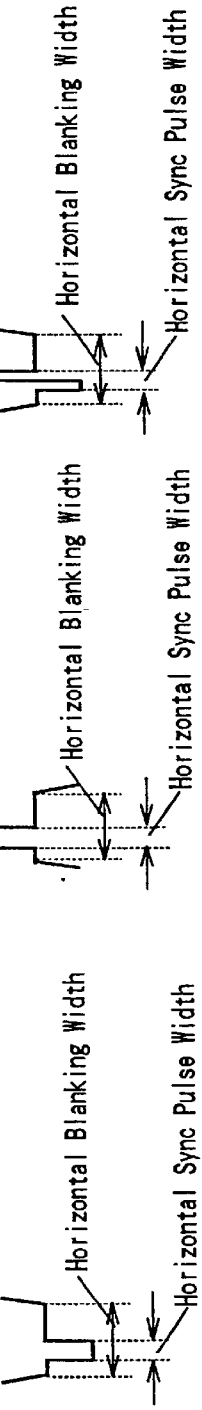

COLOR-DIFFERENCE SIGNAL CONVERSION CIRCUIT

THIS APPLICATION IS A U.S. NATIONAL PHASE APPLICATION OF PCT INTERNATIONAL APPLICATION PCT/JP98/04731.

FIELD OF THE INVENTION

The present invention relates to a color-difference signal conversion circuit to be employed in a television receiver which can reproduce a component video input signal based on various television systems in addition to a signal based on existing television systems, and in particular to a color-difference signal conversion circuit which can automatically convert, depending on various television systems, the above-mentioned component video input signal into a color-difference signal which is faithful to the colorimetry standard of the input signal. It relates more specifically to a technique that utilizes a functional relationship between transmitted chrominance signals PB and PR and color-difference signals B-Y and R-Y of an external component video input signal.

BACKGROUND OF THE INVENTION

FIG. 4 shows an example of schematic structure of an existing television receiver. In FIG. 4, numeral 1 is an input circuit for a luminance signal Y and transmitted chrominance signals PB and PR of an external component video input signal. Numeral 2 is a demodulator for color-difference signal of an existing television system (hereinafter NTSC) to demodulate color-difference signals B-Y and R-Y from a luminance signal Y and a chrominance signal C of an NTSC television signal. Numeral 3 is first selector for manually selecting from either Y, PB, and PR signals of an external component video input signal or Y, B-Y, and R-Y signals of an NTSC signal. Numeral 4 is a sync separator to separate horizontal and vertical sync signals from a Y signal. Numeral 5 is a matrix circuit which has a function of converting incoming external component video input signals Y, PB, and PR of HDTV (High Definition TV) into HDTV primary color signals R, G, and B (the function hereinafter called "HD matrix conversion function"), and a function of converting incoming NTSC signals Y, B-Y, and R-Y into NTSC primary color signals R, G, and B (the function hereinafter called "SD matrix conversion function"). The operation of the matrix circuit is described below.

In FIG. 4, external component video input signals Y, PB, and PR are fed to the Y, PB, PR input circuit 1, and are transmitted to the first selector 3.

On the other hand, an NTSC luminance signal Y and a chrominance signal C are demodulated to Y, B-Y, and R-Y signals by the NTSC color-difference signal demodulator 2 and are transmitted to the first selector 3. Either one of the Y signal of an external component video input signal or the Y signal of an NTSC signal is selected by the first selector 3, and is transmitted to the sync separator 4. Horizontal and vertical sync signals separated from the Y signal by the sync separator 4 are transmitted to a deflection circuit. Also, either set of the Y, PB, and PR signals of the external component video input signal or set of the Y, B-Y, and R-Y signals of the NTSC signal is selected by the first selector 3, and is transmitted to the matrix circuit 5. When Y, PB, and PR signals have been transmitted, they are converted into HDTV primary color signals R, G, and B by the HD matrix conversion function and transmitted to a CRT drive circuit, whereas when Y, B-Y, and R-Y signals have been transmitted, they are converted into NTSC primary color signals R, G, and B by the SD matrix conversion function and transmitted to the CRT drive circuit.

However, the above-described conventional circuit structure has become unable to cope with digitalization of television broadcast or media convergence such as internet television broadcast. In Japan, although Hi-Vision (name of an HDTV system broadcast in Japan) has heretofore been the only available external component video input, in association with the advance of digitalization of television broadcast, there is recently a tendency of digital television signals based on various television systems being transmitted in the format of component video signals Y, PB, and PR through a single transmission channel. In the United States of America, 18 systems shown in FIG. 5 are being considered as digital television systems. A television system conforming to a colorimetry standard of SMPTE 274M is called HDTV, while a television system conforming to a colorimetry standard of SMPTE 170M is called SDTV. The colorimetry standard of NTSC system is SMPTE 170M. The colorimetry standard of Hi-Vision is SMPTE 274M. An SDTV signal transmitted in the format of Y, PB, and PR signals is transmitted to the matrix circuit 5 via the first selector 3, and is converted into primary color signals R, G, and B by the HDTV matrix conversion function rather than the SD matrix conversion function, thus presenting a problem of not being able to make a precise reproduction of colors.

Furthermore, as the media convergence proceeds in the future, there is a possibility of component video signals of personal computer image in the format of Y, PB, and PR being transmitted to television receivers through Internet, presenting a problem of how to discriminate the video signal formats in order to generate an adequate color-difference signal.

As data to characterize a video signal on which to discriminate its video signal format, the data shown in FIG. 6 and combinations of each of them may be noted, namely, horizontal sync frequency, vertical sync frequency, horizontal sync signal waveform, and number of scanning lines.

DISCLOSURE OF THE INVENTION

In order to address the above problems, the present invention has introduced into a television receiver a color-difference signal conversion circuit having features as described below. When an external component video input signal is an SDTV signal, the color-difference signal conversion circuit in accordance with the present invention converts its transmitted chrominance signals PB and PR into color-difference signals B-Y and R-Y. When an external component video input signal is an HDTV signal, transmitted chrominance signals PB and PR are directly fed to first selector. And the first selector supplies as its output either the above-mentioned transmitted chrominance signals PB and PR or color-difference signals B-Y and R-Y after automatically selecting them responding to a control signal properly supplied by a video signal discriminating circuit which discriminates the video signal format based on data characterizing a video signal such as the horizontal sync frequency, vertical sync frequency, horizontal sync signal waveform, and number of scanning lines, etc., of the external component video input signal. As a result, the television receiver can reproduce a color faithful to the colorimetry standard of the above-mentioned input signal.

The invention described in claim 1 of the present invention is an invention in which, in a television receiver comprising:

a Y, PB, PR input circuit for an external component video input signal comprising luminance signal Y and transmitted chrominance signals PB and PR;

an NTSC color-difference signal demodulator to demodulate color-difference signals B-Y and R-Y from luminance signal Y and chrominance signal C of an NTSC signal;

a sync separator to extract horizontal and vertical sync signals from the Y signal;

a first selector to select from either an output signal from the NTSC color-difference signal demodulator or an output signal from the Y, PB, PR input circuit for an external component video input signal, and to supply the selected output to a matrix circuit;

and a matrix circuit having a function (HD matrix conversion function) of converting Y, PB, and PR signals into HDTV primary color signals R, G, and B when HDTV signals Y, PB, and PR conforming to the HDTV colorimetry standard have been transmitted, and a function (SD matrix conversion function) of converting Y, B-Y, and R-Y signals into SDTV primary color signals R, G, and B when SDTV signals Y, B-Y, and R-Y have been transmitted, a color-difference signal conversion circuit inserted between the Y, PB, PR input circuit and the first selector and mutually connected in series, and characterized by comprising:

a video signal discriminating circuit which determines the video signal format based on data extracted from the horizontal sync signal and the vertical sync signal and characterizing a video signal, and generates a control signal to make an amplitude conversion circuit generate a signal optimum for the colorimetry standard of the input signal;

and an amplitude conversion circuit which automatically converts amplitudes of the Y, PB, and PR signals supplied by the Y, PB, PR input circuit responding to the control signal generated by the video signal discriminating circuit, and generates a signal to reproduce a color faithful to the colorimetry standard of the input signal; is incorporated, and the color-difference signal conversion circuit is capable of reproducing a color faithful to the colorimetry standard of the input signal as it automatically converts the amplitudes of Y, PB, and PR as supplied by the Y, PB, PR input circuit depending on the video signal format of the Y, PB, PR input signal, and supplies its output to the matrix circuit.

BRIEF DESCRIPTION OF THE DRAWINGS

FIG. 5 is a table of major digital television systems of the United States of America.

FIG. 6 shows data characterizing video signals based on which a video signal format can be discriminated.

DESCRIPTION OF THE PREFERRED EMBODIMENTS

Figure 1:
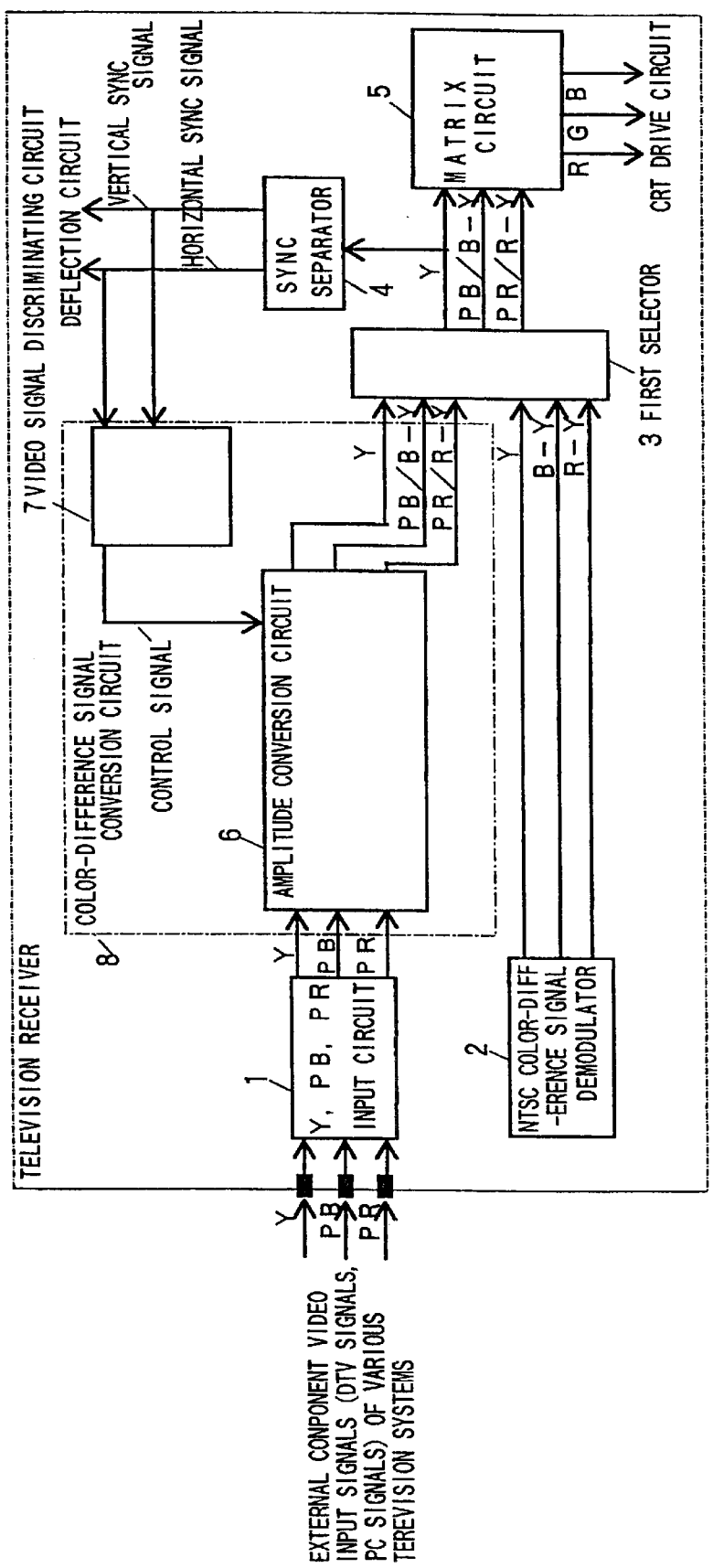
FIG. 1 is a block diagram of a color-difference signal conversion circuit in the first exemplary embodiment of the present invention incorporated into a television receiver.
Figure 4:
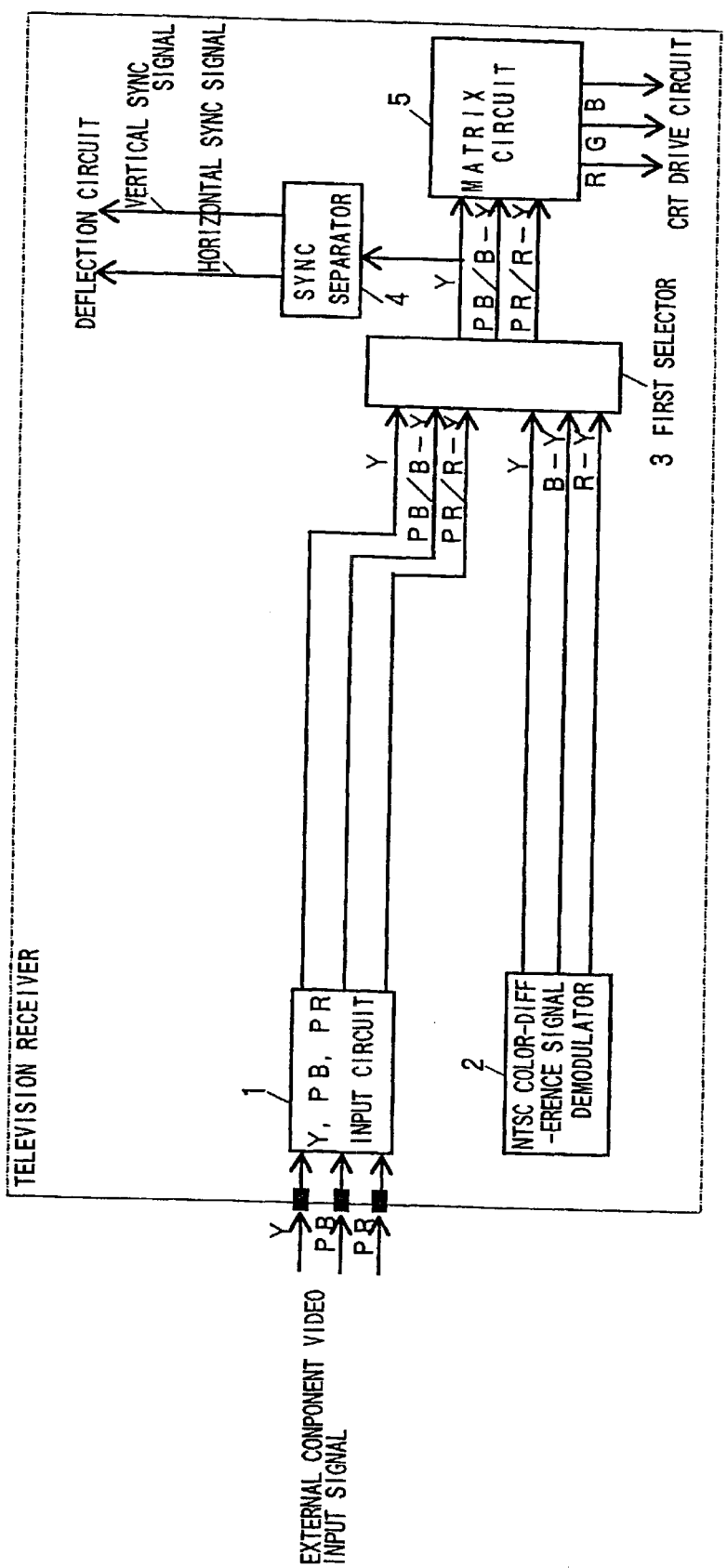
FIG. 4 is a block diagram of an existing television receiver.

Referring to FIG. 1, first exemplary embodiment of the present invention is described below. The same circuits as indicated in a conventional example shown in FIG. 4 are represented by the same reference numerals. In FIG. 1, numeral 1 is an input circuit for Y, PB, and PR signals of an external component video signal. Numeral 2 is an NTSC color-difference signal demodulator to demodulate color-difference signals B-Y and R-Y from an NTSC luminance signal Y and a chrominance signal C. Numeral 3 is first selector to select from either Y, PB, and PR signals of an external component video input signal or Y, B-Y, and R-Y signals of an NTSC signal. Numeral 4 is a sync separator to separate horizontal and vertical sync signals from the Y signal. Numeral 5 is a matrix circuit having HD matrix conversion function and SD matrix conversion function. Numeral 8 is a color-difference signal conversion circuit inserted between the Y, PB, PR input circuit 1 and the first selector 3, all of which being mutually connected in series.

The color-difference signal conversion circuit 8 comprising:

a video signal discriminating circuit 7 which measures, using the horizontal sync signal and vertical sync signal, horizontal sync frequency, vertical sync frequency, horizontal sync signal waveform, and the number of scanning lines, each of which characterizing a video signal, and determines the video signal format based on these data, and transmits to an amplitude conversion circuit 6 a control signal that makes the amplitude conversion circuit 6 generate an optimum signal for the colorimetry standard of the input signal;

and the amplitude conversion circuit 6 which automatically converts amplitudes of the Y, PB, and PR signals supplied by the Y, PB, PR input circuit responding to the control signal supplied by the above video signal discriminating circuit 7, and generates a signal to reproduce a color faithful to the colorimetry standard of the input signal.

Operation of the color-difference signal conversion circuit 8 is described below.

In FIG. 1, an external component video input signal is fed to the Y, PB, PR input circuit 1, and is transmitted to the amplitude conversion circuit 6 of the color-difference signal conversion circuit 8.

On the other hand, luminance signal Y and chrominance signal C of an NTSC signal are demodulated into Y, B-Y, and R-Y signals by the NTSC color-difference signal demodulator 2, and are transmitted to the first selector 3. Either the Y signal of the external component video input signal or the Y signal of the NTSC signal as selected by the first selector 3 is transmitted to the sync separator 4. The horizontal and vertical sync signals separated from the Y signal by the sync separator 4 is fed to a deflection circuit and to the video signal discriminating circuit 7 of the color-difference signal conversion circuit 8. When the video signal discriminating circuit 7 detects from the horizontal and vertical sync signals a horizontal sync frequency of 33.75 kHz, vertical sync frequency of 60 Hz, width of horizontal blanking of 3.77 $\mu$sec of horizontal sync signal format (2), width of horizontal sync pulse of 1.19 $\mu$sec, and number of scanning lines of 1125 lines, it determines that the video signal is that of the HDTV-8 system in FIG. 6, and transmits a control signal H to the amplitude conversion circuit 6. Responding to the control signal H, the amplitude conversion circuit 6 transmits Y, PB, and PR signals to the first selector 3.

Next, when the video signal discriminating circuit 7 detects from the horizontal and vertical sync signals a horizontal sync frequency of 31.47 kHz, vertical sync frequency of 60 Hz, width of horizontal blanking of 5.11 μsec of the horizontal sync signal format (1), width of horizontal sync pulse of 2.07 μsec, and number of scanning lines of 525 lines, it determines that the video signal is that of the SDTV-3 system in FIG. 6, and transmits a control signal L to the amplitude conversion circuit 6. Responding to the control signal L the amplitude conversion circuit 6 transmits Y, B-Y, and R-Y signals to the first selector 3.

Next, when the video signal discriminating circuit 7 detects from the horizontal and vertical sync signals a horizontal sync frequency of 31.47 kHz, vertical sync frequency of 59.95 Hz, width of horizontal blanking of 6.36 μsec of the horizontal sync signal format (1), width of horizontal sync pulse of 3.81 μsec, and number of scanning lines of 525 lines, it determines that the video signal is that of a personal computer, namely, PC: VGA, and transmits a control signal S to the amplitude conversion circuit 6. When the control signal S is transmitted, as the matrix circuit 5 cannot make signal conversion, the amplitude conversion circuit 6 does not supply the output signal to the first selector 3.

Also, the selector 3 selects either the Y, PB, and PR signals of the external component video input signal, the Y, B-Y and R-Y signals of NTSC signal or the Y, B-Y, and R-Y signals of the external component video input signal, and the selected signals are transmitted to the matrix circuit 5. In the matrix circuit 5, the Y, PB, and PR signals are converted into HDTV primary color signals R, G, and B by the HD matrix conversion function, and the Y, B-Y, and R-Y signals are converted into SDTV primary color signals R, G, and B by the SD matrix conversion function.

Second exemplary embodiment of the present invention is described below.

The second exemplary embodiment of the present invention is an embodiment made by realizing the video signal discriminating circuit 7 shown in FIG. 1 of the first exemplary embodiment with a one-chip microcontroller, the operation of which is described below.

In FIG. 1, the microcontroller comprising:
means for measuring from each of the horizontal sync signal and vertical sync signal fed from the sync separator 4 such data characterizing a video signal as the horizontal sync frequency, vertical sync frequency, blanking width of the horizontal sync signal, width of horizontal sync pulse, polarity of the horizontal sync signal, etc.;
means for calculating the number of scanning lines from the horizontal sync frequency and vertical sync frequency;
and memory means in which data (horizontal sync frequency, vertical sync frequency, blanking width of the horizontal sync signal, width of horizontal sync pulse, polarity of the horizontal sync signal, number of scanning lines, etc.) characterizing video signals of the input signal formats (SDTV-1 and -3, HDTV-4 and -8, PC:VGA, etc.) shown in FIG. 6 are stored in advance in a tabular form.

When the one-chip microcontroller measures a horizontal sync frequency of 31.47 kHz, a vertical sync frequency of 60 Hz, a horizontal blanking width of 5.11 μsec of the horizontal sync signal format (1), and a width of horizontal sync pulse of 2.07 μsec, it calculates the number of scanning lines (525 lines) from the horizontal sync frequency and the vertical sync frequency, and compares the measured data with each of the data stored in the memory means. When the measured data agree with the data of SDTV-1 in FIG. 6, the one-chip microcontroller determines that the input signal is a video signal of SDTV-1, and transmits a control signal to the amplitude conversion circuit 6 to make the amplitude conversion circuit 6 generate a signal optimum for the colorimetry standard of the input signal.

Figure 2:
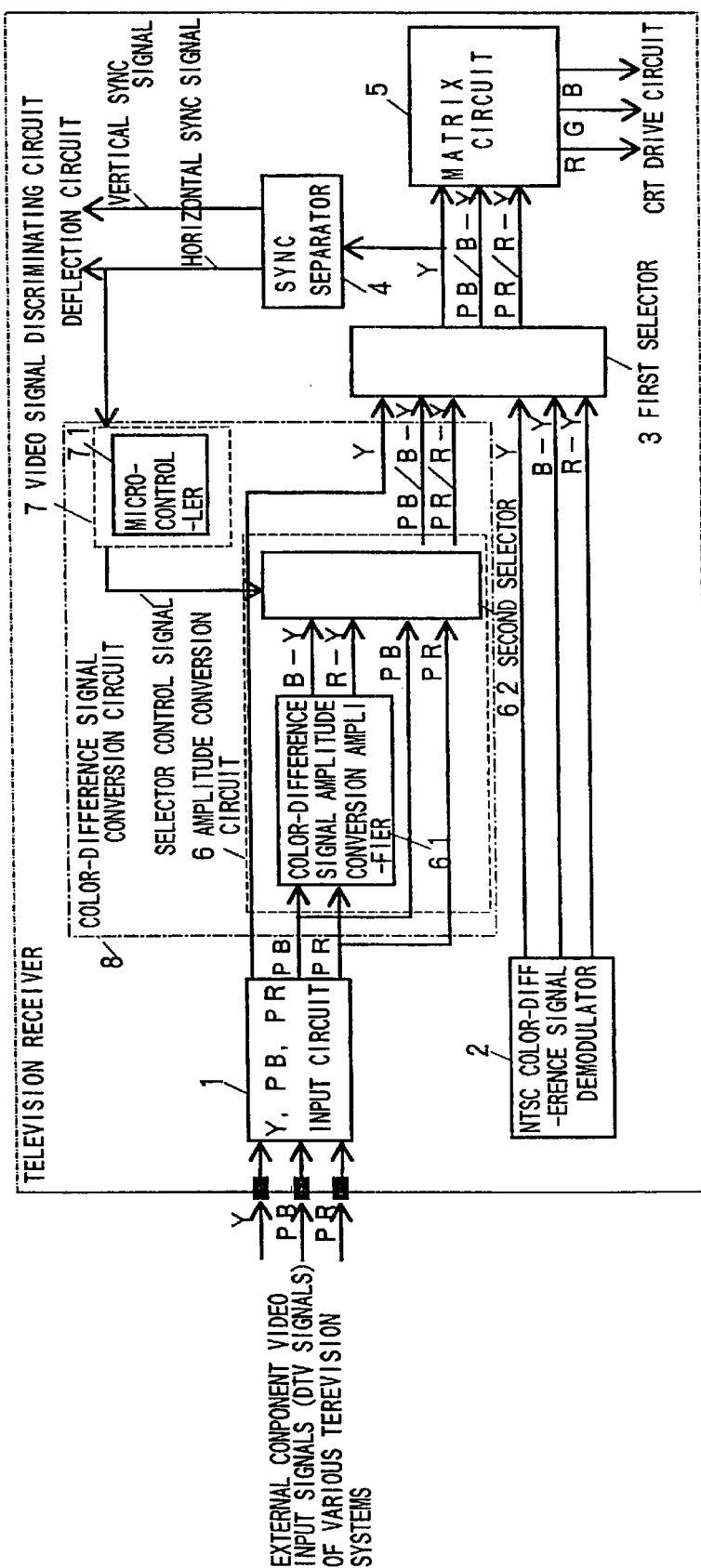
FIG. 2 is a block diagram of a color-difference signal conversion circuit in the third exemplary embodiment of the present invention incorporated into a television receiver.

Referring now to FIG. 2, a third exemplary embodiment of the present invention is described below.

The third exemplary embodiment of the present invention is one in which the cost is reduced by simplifying the first exemplary embodiment. When receiving a digital television broadcast as shown in FIG. 5, as the video signal format can be determined by the horizontal sync frequency alone, the video signal discriminating circuit 7 of the color-difference signal conversion circuit 8 can be simplified.

The same circuits as indicated in a conventional example shown in FIG. 4 are represented by the same reference numerals.

In FIG. 2, numeral 1 is an input circuit for Y, PB, and PR signals of an external component video signal. Numeral 2 is an NTSC color-difference signal demodulator to demodulate color-difference signals B-Y and R-Y from luminance signal Y and chrominance signal C of an NTSC signal. Numeral 3 is first selector to select from either Y, PB, and PR signals of an external component video input signal or Y, B-Y, and R-Y signals of an NTSC signal. Numeral 4 is a sync separator to separate horizontal and vertical sync signals from the Y signal. Numeral 5 is a matrix circuit having HD matrix conversion function and SD matrix conversion function. Numeral 8 is a color-difference signal conversion circuit inserted between the Y, PB, PR input circuit 1 and the first selector 3, all of which being mutually connected in series.

The color-difference signal conversion circuit 8 comprising:
a video signal discriminating circuit 7 which detects a horizontal sync frequency and generates a selector control signal;
and an amplitude conversion circuit 6 which automatically converts the amplitudes of Y, PB, and PR supplied by the Y, PB, PR input circuit responding to the selector control signal supplied by the video signal discriminating circuit 7, and generates a signal to reproduce a color faithful to the colorimetry standard of the input signal.

The video signal discriminating circuit 7 comprises a one-chip microcontroller 71 which comprises means to measure horizontal sync frequency from a horizontal sync signal and memory means in which data (horizontal sync frequency) that characterize video signals of the input signal formats (SDTV, HDTV) shown in FIG. 5 are stored in advance, and compares the measured data (horizontal sync frequency) with each of the data stored in the memory means, and generates, when there is an agreement, a selector control signal to make the amplitude conversion circuit 6 generate a signal optimum for the colorimetry standard of the input signal.

The amplitude conversion circuit 6 comprises a color-difference signal amplitude conversion amplifier 61 which converts PB and PR signals into B-Y and R-Y signals, and second selector 62 which switches between the signals to and from the color-difference signal amplitude conversion amplifier 61 by a selector control signal.

Operation of the third exemplary embodiment is described below.

In FIG. 2, an external component video input signal is supplied to the Y, PB, PR input circuit 1 and transmitted to the color-difference signal amplitude conversion amplifier 61 and the second selector 62. After passing through the color-difference signal amplitude conversion amplifier 61, the PB and PR signals are amplitude-converted into B-Y and R-Y signals, and transmitted to second selector 62. The Y, PB, and PR signals or Y, B-Y, and R-Y signals selected by the second selector 62 are transmitted to the first selector 3.

On the other hand, the NTSC luminance signal Y and chrominance signal C are demodulated to Y, B-Y, and R-Y signals by the NTSC color-difference signal demodulator 2, and are transmitted to the first selector 3. Either the Y signal of the external component video input signal or the Y signal of the NTSC signal as selected by the first selector 3 is transmitted to the sync separator 4. Horizontal and vertical sync signals separated from the Y signal by the sync separator 4 are transmitted to a deflection circuit, and the horizontal sync signal is transmitted to the microcontroller 71 of the video signal discriminating circuit 7 of the color-difference signal conversion circuit 8. When the microcontroller 71 detects a horizontal sync frequency of 33.75 kHz (in the case of the HDTV-7 system in FIG. 4), the second selector 62 selects Y, PB, and PR signals before they pass through the color-difference signal amplitude conversion amplifier 61, while, when the microcontroller 71 detects horizontal sync signals of 31.47 kHz (in the case of the SDTV-6 system in FIG. 4) and 15.73 kHz (in the case of the SDTV-1 system in FIG. 4), the second selector 62 selects the Y, B-Y, and R-Y signals after they have passed the color-difference signal amplitude conversion amplifier 61, and transmits them to the first selector 3.

Also, the Y, PB, and PR signals of the external component video input signal, the Y, B-Y and R-Y signals of NTSC signal or the Y, B-Y, and R-Y signals of the external component video signal are selected by the first selector 3 and transmitted to the matrix circuit 5, where the Y, PB, and PR signals are converted into HDTV primary color signals R, G, and B by the HD matrix conversion function, and the Y, B-Y, and R-Y signals are converted into SDTV primary color signals R, G, and B by the SD matrix conversion function.

A fourth exemplary embodiment of the present invention is described below in reference to FIG. 3.

The fourth exemplary embodiment of the present invention is one in which the first exemplary embodiment of the present invention is further simplified and the cost is reduced.

The same circuits as indicated in a conventional example shown in FIG. 4 are represented by the same reference numerals.

Figure 3:
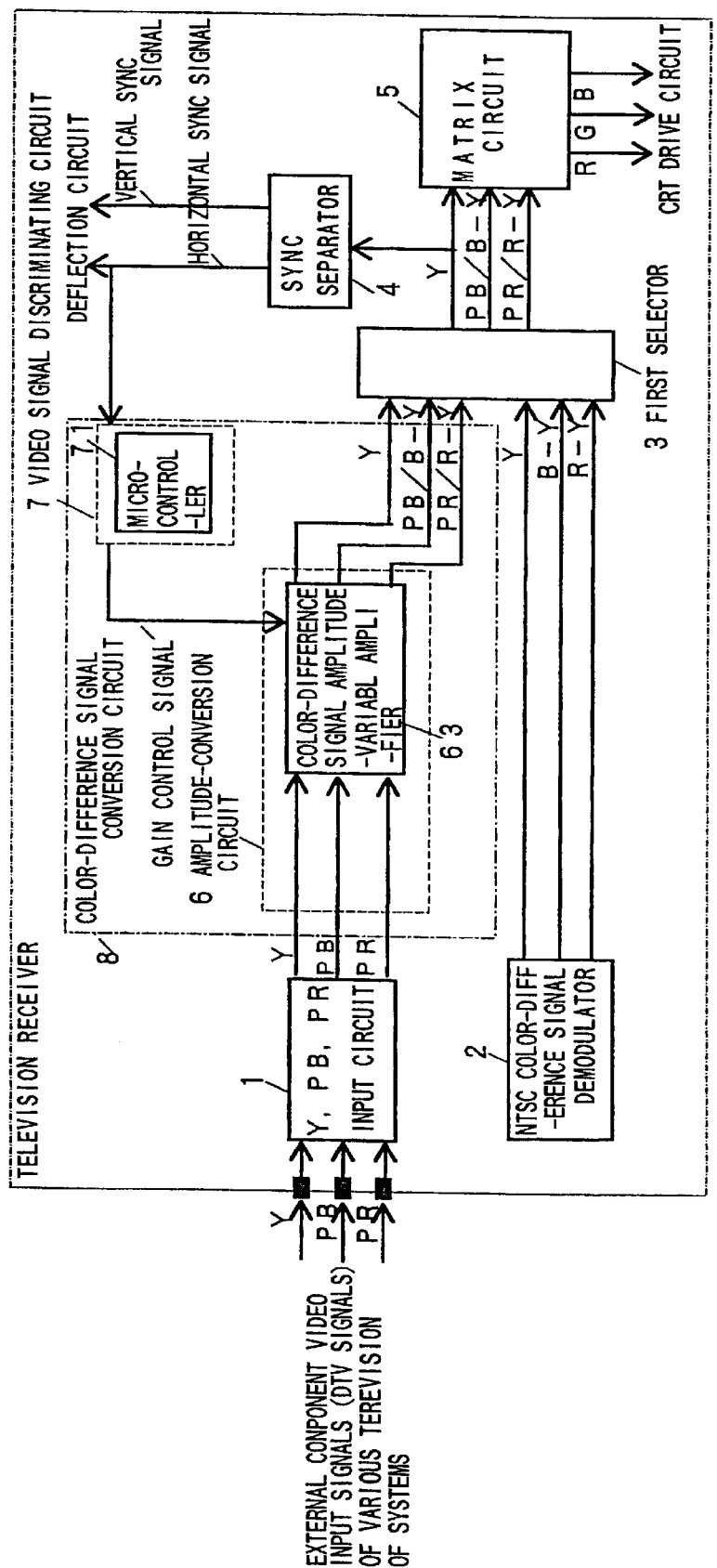
FIG. 3 is a block diagram of a color-difference signal conversion circuit in the fourth exemplary embodiment of the present invention incorporated into a television receiver.

In FIG. 3, numeral 1 is an input circuit for Y, PB, and PR signals of an external component video input signal. Numeral 2 is an NTSC color-difference signal demodulator to demodulate color-difference signals B-Y and R-Y from luminance signal Y and chrominance signal C of an NTSC signal. Numeral 3 is first selector to select from either Y, PB, and PR signals of the component video input signal and the Y, B-Y, or R-Y signals of the NTSC signal. Numeral 4 is a sync separator to separate horizontal and vertical sync signals from the Y signal. Numeral 5 is a matrix circuit having HD matrix conversion function and SD matrix conversion function. Numeral 8 is a color-difference signal conversion circuit inserted between the Y, PB, PR input circuit 1 and the first selector 3, all of which being mutually connected in series.

The color-difference signal conversion circuit 8 comprises a video signal discriminating circuit 7 which detects a horizontal sync frequency and generates a gain control signal, and an amplitude conversion circuit 6 which automatically converts the amplitudes of Y, PB, and PR signals supplied by the Y, PB, PR input circuit responding to a gain control signal supplied by the video signal discriminating circuit 7 and generates a signal to reproduce a color faithful to the colorimetry standard of the input signal.

The video signal discriminating circuit 7 comprises a one-chip microcontroller 71 which comprises means for measuring horizontal sync frequency from a horizontal sync signal and memory means in which data (horizontal sync frequencies) that characterize video signals of the input signal formats (SDTV, HDTV) shown in FIG. 5 are stored in advance, and compares each of the data stored in the memory means and the measured data (horizontal sync frequency) and, when agreement is found, supplies a gain control signal to make the amplitude conversion circuit 6 generate a signal optimum for the colorimetry of the input signal.

The amplitude conversion circuit 6 comprises a color-difference signal amplitude-variable amplifier 63 which converts the PB and PR signals into B-Y and R-Y signals by a gain control signal corresponding to the horizontal sync frequency of the input signal.

Operation of the amplitude conversion circuit 6 is described below.

In FIG. 3, an external component video input signal is fed to the Y, PB, PR input circuit 1, and transmitted to the color-difference signal amplitude-variable amplifier 63 of the amplitude conversion circuit of the color-difference signal conversion circuit 8. The PB and PR signals or B-Y and R-Y signals that have passed the color-difference signal amplitude-variable amplifier 63 are transmitted to the first selector 3.

On the other hand, luminance signal Y and chrominance signal C of an NTSC signal are demodulated to Y, B-Y, and R-Y signals by the NTSC color-difference signal demodulator 2 and are transmitted to the first selector 3. The Y signal of the external component video input signal or the Y signal of the NTSC signal selected by the first selector 3 is transmitted to the sync separator 4. Horizontal and vertical sync signals separated from the Y signal by the sync separator 4 are fed to a deflection circuit and to the microcontroller 71 of the video signal discriminating circuit 7 of the color-difference signal conversion circuit 8. When a horizontal sync frequency of 33.75 kHz is detected by the microcontroller 71, the color-difference signal amplitude-variable amplifier 63 will have a gain of unity and generates Y, PB, and PR signals. When horizontal sync frequencies of 31.47 kHz and 15.73 kHz are detected, the color-difference signal amplitude-variable amplifier 63 amplifies the amplitudes of Y, PB, and PR signals, generates Y, B-Y, and R-Y signals, and transmits them to the first selector 3.

The Y, PB, and PR signals of the external component video input signal or NTSC signal as selected by the first selector 3 and the Y, B-Y, and R-Y signals of the external component video input signal are transmitted to the matrix circuit 5, where the Y, PB, and PR signals are converted into HDTV primary color signals R, G, and B by the HD matrix conversion function, and the Y, B-Y, and R-Y signals are converted into SDTV primary color signals R, G, and B by the SD matrix conversion function.

INDUSTRIAL APPLICATION

According to the present invention, it becomes possible to reproduce a color faithful to the colorimetry standard of an input signal of a component video signal of any television system fed to a television receiver of the present invention by incorporating in the existing television receiver a color-difference signal conversion circuit 8 characterized by comprising a video signal discriminating circuit 7 which determines the video signal format based on data obtained by measuring horizontal sync frequency, vertical sync frequency, horizontal sync signal waveform, and number of scanning lines, all of which characterizing a video signal, and which generates a control signal to make an amplitude conversion circuit 6 generate a signal optimum for the colorimetry standard of the input signal, and the amplitude conversion circuit 6 which automatically converts the amplitudes of Y, PB, and PR signals supplied by the above-described Y, PB, PR input circuit responding to a control signal supplied by the video signal discriminating circuit 7, and generates a signal to reproduce a color faithful to the colorimetry standard of the input signal.

In view of an increasing tendency, in accordance with the advance of digitalization of television broadcasts, toward transmission of television signals of various television systems in the format of component video signals Y, PB, and PR, it provides a significant practical effect in realizing a low cost digital-compatible television receiver to be able to reproduce a color faithful to the colorimetry standard of the input signal by adding a small-scale circuit to the existing television receiver in accordance with the present invention even when a signal based on any television system is fed to the television receiver in accordance with the present invention.

Also, as the color-difference signal conversion circuit 8 is compatible with a video signal of a personal computer, it can also cope with future age of media convergence.

What is claimed is:

1. A color-difference signal conversion circuit adapted to be connected
    to an input circuit (1) for an external component video input signal which comprises a luminance signal Y and chrominance signals PB and PR,
    to a sync separator (4) which extracts horizontal and vertical sync signals from said Y signal, and
    to a first selector (3) which either selects an output signal of a color-difference signal demodulator (2) of an existing television system for demodulating color-difference signals B-Y and R-Y from a luminance signal Y and a chrominance signal C of a video signal of an existing television system or selects an output signal of said input circuit (1) and applies the selected output signal to a matrix circuit (5) for converting Y, PB, PR signals or Y, B-Y, R-Y signals into R, G, B primary color signals,
    said color-difference conversion circuit comprises:
    a video system discriminating circuit (7) which determines a video signal format based on a data which are extracted from said horizontal sync signal and said vertical sync signal and generating a control signal depending on the determined video signal format,
    an amplitude conversion circuit (6) which automatically connects amplitudes of said Y, PB and PR signals supplied by said input circuit (1) in response to said control signal generated by said video signal discriminating circuit (7) and generates video signals for reproducing a color faithful to the colorimetry standard of the input signal.

2. A color-difference signal conversion circuit of claim 1, wherein said video signal discrimination circuit (7) has a microcontroller (71) which comprises:
    means for measuring a horizontal sync frequency, a vertical sync frequency, and a horizontal sync signal waveform from said horizontal sync signal and said vertical sync signal;
    memory means for storing data of said horizontal sync frequency, said vertical sync frequency, said horizontal sync signal waveform, and a number of scanning lines of a signal conforming to the colorimetry of an input signal; and
    means for calculating a number of scanning lines from said horizontal sync frequency and said vertical sync frequency, and generating, by referring to the data stored in said memory means, a control signal to make said amplitude conversion circuit (6) generate a signal optimum to the colorimetry standard of the input signal.

3. A color-difference signal conversion circuit of claim 1, wherein said video signal discriminating circuit (7) having a microcontroller (71) which comprises:
    means for measuring a horizontal sync frequency from a horizontal sync signal;
    memory means for storing data of a horizontal sync frequency of a signal conforming to the colorimetry standard of an input signal and generating by referring to the data in said memory means, a selector control signal to make an amplitude conversion circuit (6) generate a signal optimum for the colorimetry of the input signal; and
    wherein said amplitude conversion circuit (6) comprising:
        a color-difference signal amplitude-variable amplifier (61) to convert PB and PR signals supplied by said Y, PB, PR input circuit (1) into B-Y and R-Y signals by amplifying their amplitudes; and
        a second selector (62) to automatically switch signals before and after passing through said color-difference signal amplitude-variable amplifier (61) responding to a selector control signal supplied by said video signal discriminating circuit (7), and to generate a signal to reproduce a color faithful to the colorimetry of the input signal; and inserted between said Y, PR input circuit (1) and said first selector (3), and mutually connected in series.

4. A color-difference signal conversion circuit of claim 1, wherein said video signal discriminating circuit (7) having a microcontroller (71) which comprises:
    means for measuring a horizontal sync frequency from a horizontal sync signal;
    memory means for storing data of a horizontal sync frequency of a signal conforming to the colorimetry standard of an input signal and generating, by referring to the data stored in said memory means, a gain control signal to make an amplitude conversion circuit (6) generate a signal optimum for the colorimetry of the input signal; and
    wherein said amplitude conversion circuit (6) comprising a color-difference signal amplitude-variable amplifier (63) which automatically varies the degree of amplification responding to a gain control signal supplied by said video signal discriminating circuit (7) and converts PB and PR signals supplied by said Y, PB, PR input circuit (1) into signals to reproduce colors faithful to the colorimetry standard, and being inserted between said Y, PB, PR input circuit (1) and said first selector (3) and mutually connected in series.

5. A television receiver according to any of the preceding claims which comprises said color-difference signal conversion circuit.

* * * * *